United States Patent
Philipp (10) Patent No.: US 9,411,481 B2
(45) Date of Patent: Aug. 9, 2016

(54) HYBRID CAPACITIVE TOUCH SCREEN ELEMENT

(75) Inventor: Harald Philipp, Hamble (GB)

(73) Assignee: Atmel Corporation, San Jose, CA (US)

( * ) Notice: Subject to any disclaimer, the term of this patent is extended or adjusted under 35 U.S.C. 154(b) by 1016 days.

(21) Appl. No.: 11/734,813

(22) Filed: Apr. 13, 2007

(65) Prior Publication Data

US 2007/0247443 A1 Oct. 25, 2007

Related U.S. Application Data

(60) Provisional application No. 60/745,583, filed on Apr. 25, 2006.

(51) Int. Cl.
*G06F 3/041* (2006.01)
*G06F 3/045* (2006.01)
*G06F 3/044* (2006.01)

(52) U.S. Cl.
CPC ............ *G06F 3/045* (2013.01); *G06F 3/044* (2013.01)

(58) Field of Classification Search
USPC .............................. 345/156–173; 178/18–19
See application file for complete search history.

(56) References Cited

U.S. PATENT DOCUMENTS

| | | | |
|---|---|---|---|
| 3,593,115 A | 7/1971 | Dym et al. | |
| 4,087,625 A * | 5/1978 | Dym ................. | G06F 3/044 178/18.06 |
| 4,198,539 A | 4/1980 | Pepper, Jr. | |
| 4,705,919 A * | 11/1987 | Dhawan .............. | G06F 3/044 178/18.03 |
| 4,952,757 A * | 8/1990 | Purcell ............... | G06F 3/046 178/18.07 |
| 4,999,462 A * | 3/1991 | Purcell ............... | G06F 3/044 178/18.03 |
| 5,650,597 A | 7/1997 | Redmayne | |
| 5,730,165 A | 3/1998 | Philipp | |
| 5,940,065 A | 8/1999 | Babb et al. | |
| 6,288,707 B1 | 9/2001 | Philipp | |
| 6,297,811 B1 * | 10/2001 | Kent .................. | G06F 3/044 178/18.01 |
| 6,466,036 B1 | 10/2002 | Philipp | |
| 6,506,983 B1 | 1/2003 | Babb et al. | |
| 6,535,200 B2 | 3/2003 | Philipp | |
| 7,148,704 B2 | 12/2006 | Philipp | |
| 7,663,607 B2 | 2/2010 | Hotelling | |
| 7,920,129 B2 | 4/2011 | Hotelling | |

(Continued)

FOREIGN PATENT DOCUMENTS

| | | |
|---|---|---|
| EP | 1335318 A1 | 8/2003 |
| EP | 1335318 A2 | 8/2003 |

*Primary Examiner* — Kumar Patel
*Assistant Examiner* — Vinh Lam
(74) *Attorney, Agent, or Firm* — Baker Botts L.L.P.

(57) ABSTRACT

A capacitive touch sensitive position sensor is provided which has a substrate defining a touch sensitive platform. First and second resistive bus-bars arranged spaced apart on the substrate. A conductive sensing area is formed between the bus bars and is constructed with first and second conductive elements connected to the first and second resistive bus-bars respectively, and spaced apart from each other by non-conducting gaps, so that currents induced in the conductive sensing area flow towards the bus-bars, but are prevented from flowing in a direction parallel to the bus-bars. This design removes pin-cushion distortion and enhances linearization of the output signals. Because the sensing region is not galvanically coupled from one bus bar to the other, the voltage gradients remain uniform and undistorted. Capacitive coupling from one side to the other does not produce a distortion component provided that the capacitance is allowed to fully charge and discharge across all locations in the sensing region.

24 Claims, 7 Drawing Sheets

(56) References Cited

U.S. PATENT DOCUMENTS

| | | | |
|---|---|---|---|
| 8,031,094 B2 | 10/2011 | Hotelling | |
| 8,031,174 B2 | 10/2011 | Hamblin | |
| 2003/0222857 A1* | 12/2003 | Abileah | G02F 1/13338 345/173 |
| 2005/0162408 A1* | 7/2005 | Martchovsky | G06F 3/044 345/173 |
| 2006/0132462 A1* | 6/2006 | Geaghan | G06F 3/044 345/173 |
| 2007/0247443 A1 | 10/2007 | Philipp | |

\* cited by examiner

HYBRID CAPACITIVE TOUCH SCREEN ELEMENT

This invention claims priority from U.S. provisional application 60/745,583 filed on 25 Apr. 2006. Co-pending application U.S. Ser. No. 10/916,759, published as US 2005/0041018 A1 is incorporated by reference herein.

BACKGROUND OF THE INVENTION

The invention pertains to 2-dimensional touch sensing surfaces operable by a human finger, or a stylus. Example devices include touch screens and touch pads, particularly those over LCDs, CRTs and other types of displays, or pen-input tablets, or encoders used in machinery for feedback control purposes.

In my earlier co-pending U.S. application Ser. No. 10/916,759, published as US 2005/0041018 A1, I describe a pattern of conductors which have anisotropic galvanic properties within the sensing region, due to the use of conductive stripes which prevent current flows in more than one direction, or possibly through the use of a special anisotropic conductive material which can be unpatterned. At least four electrodes are connected, one to each of the corners of the sensing layer and a capacitive sensing circuit which detects the signals associated with finger touch. A processor mathematically computes the centroid location of touch within the area using ratiometric methods. A simple quadratic equation or other method corrects for pin-cushion distortion that appears on only two sides of the sensing region.

In U.S. Pat. No. 3,593,115 there is shown a touch element having triangulated shapes for determining object position. However, this scheme requires numerous secondary electrode connections as well as two or more layers of construction, increasing construction costs and reducing transparency.

U.S. Pat. No. 5,650,597 shows a 2D sensing method which in its active area requires only one layer but requires large numbers of electrode connections. Resistive strips resolve one axis of position, and the accuracy is dependent on the tolerance of large numbers of resistive strips. This method however does suppress hand shadow effects.

In U.S. Pat. No. 6,297,811 there is described a touch screen using triangulated wire outline electrode shapes to create field gradients. However this patent suffers from the problem that it is difficult to scale up the screen size, as the number of electrode connections to a sensing circuit is one per triangle. It is desirable to dramatically reduce the number of connections in order to reduce cost and simplify construction. Also it is desirable to use solid shapes rather than wire outlines which are more expensive to construct. This method however does suppress hand shadow effects.

It is not known or obvious from the prior art how to combine any of the teachings from the above-mentioned patents in a way that provides for a one-layer sensing region with a reduced number of connection electrodes and suppression of hand-shadow as evidenced by the fact that to date nobody has arrived at such a solution.

The term 'two-dimensional capacitive transducer' or '2DCT' will be used throughout to refer to touch screens, touch sensing pads, proximity sensing areas, display overlay touch screens over LCD, plasma, or CRT screens or the like, position sensing for mechanical devices or feedback systems, or other types of control surfaces without limitation, having a surface or volume capable of reporting at least a 2-dimensional coordinate, Cartesian or otherwise, related to the location of an object or human body part, by means of a capacitance sensing mechanism.

The term 'two-dimensional resistive transducer' or '2DRT' will be used throughout to refer to touch screens or pen input devices based on purely galvanic principles, and known in the industry generically and primarily as 'resistive touch screens'.

The term '2DxT' refers to elements of either the 2DCT or 2DRT type.

The term 'touch' throughout means touch or proximity by a human body part or mechanical component of sufficient capacitive signal strength to generate a desired output. In the sense of 'proximity', touch can also mean to 'point' at a 2DCT without making physical contact, where the 2DCT responds to the capacitance from the proximity of the object sufficient to react properly.

The term 'element' throughout refers to the active sensing element of a 2DCT or 2DRT. The term 'electrode' refers to a connection point at the periphery of the element.

The term 'stripe' refers to an electrical line conductor that is a component part of an element and which has two ends. A stripe can be a wire. A stripe can have substantial galvanic resistance by intent, whereas a wire has minimal resistance. If the element of which it is a part is physically curved, the stripe would also be physically curved.

The term 'pin cushion' refers to any distortion of the signal from a 2DCT whether parabolic, barrel, or other form of 2D dimensional aberration.

Many types of 2DCT are known to suffer from geometric distortion characterized as 'pin cushion' or 'hyperbolic' or 'parabolic', whereby the reported coordinate of touch is in error due to electrical effects on the sensing surface. These effects are described in more depth in various other patents for example in Pepper U.S. Pat. No. 4,198,539. An excellent summary of the known causes, solutions, and problems of the solutions to geometric distortion can be found in a reading of Babb et al, in U.S. Pat. No. 5,940,065 and U.S. Pat. No. 6,506,983. U.S. Pat. No. 5,940,065 describes succinctly the two major classes of correction: 1) Electromechanical methods involving design of or modification to the sensing surface or the connecting electrodes; 2) Modeling methods using mathematical algorithms to correct the distortions.

In my U.S. Pat. No. 7,148,704 "Charge Transfer Capacitive Position Sensor" there is described in conjunction with FIG. 12 thereof a method of using individual resistive 1-D stripes to create a touch screen. These stripes can be read either in parallel or sequentially, since the connections to these stripes are independent of one another. Furthermore, in connection with FIG. 6 thereof there is described an interpolated coupling between adjacent lumped electrode elements and an object such as a finger. U.S. Pat. No. 7,148,704 is incorporated herein by reference.

In my U.S. Pat. No. 6,288,707 a capacitive position sensor is described that is intended to function as part of a computer pointing device that employs ratiometric capacitive sensing techniques. An array of patterned metallic electrodes is disposed on an insulating substrate layer, where the electrode geometry is selected to generate a varying capacitive output as a user's finger moves across the electrode array.

Figure 7:
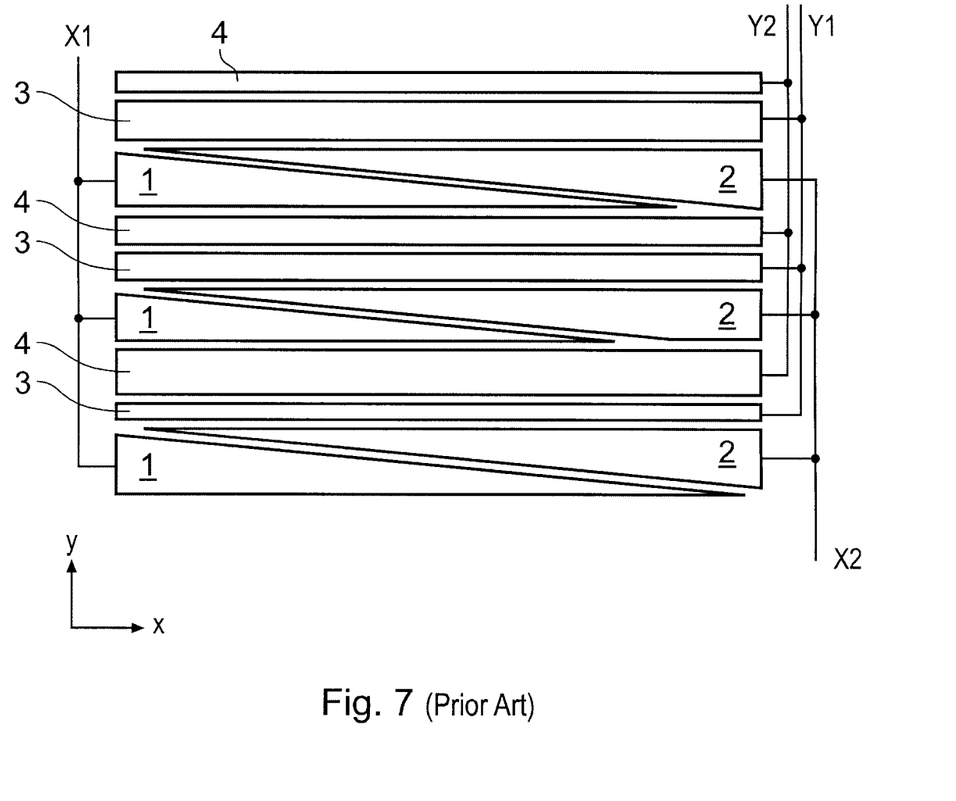
FIG. 7 shows a prior art 2DCT as disclosed in FIG. 4 of U.S. Pat. No. 6,288,707.

FIG. 7 of the accompanying drawings reproduces FIG. 4 of U.S. Pat. No. 6,288,707. An array of patterned metallic electrodes is disposed on an insulating layer where the electrode geometry is selected to generate a varying capacitive output as a user's finger moves across the electrode array. This arrangement comprises four interspersed electrode sets, two for each dimension. The x-axis sets, which are triangular, are easier to see and understand. A first set of triangles 1 are all electrically connected together to an output bus denoted as X1. The second set 2 are also connected together to an output labelled X2. The position of a user's hand with respect to the x-axis can be ascertained from the ratio of signals from X1 and X2. Because capacitance is directly proportional to surface area, and because the plates connected to X1 aggregate to a greater surface area to the left than do the plates connected to X2 (and vice versa) the ability to take the ratio of X1/X2 or X2/X1 is preserved so long as a great enough finger area is over the pattern at a close enough range to provide sufficient signal strength. A corresponding set of plates are connected to the Y1 and Y2 buses. The Y-connected set is also ratiometric, although in a manner different from the X sets. The Y set consists of alternating Y1-connected and Y2-connected rectangular stripes, 3 and 4 respectively, having a y-axis dimension that varies with placement in such a manner so as to create a smoothly varying ratio of surface area between Y1 and Y2 with location Y. The sum of each adjacent pair of the y-axis stripes 3 and 4 is made constant so that the sum of the capacitance is the same for any two paired stripes, i.e., C(Y1)+C(Y2)=C(Y) for each pair of stripes. Then, as the user's fingers move along the y-axis, the detected capacitance ratio is measured in the same manner as the CX1)/C(X2) ratio, i.e. the largest value becomes the numerator. However, this design offers limited resolution for the 2DCT.

SUMMARY OF THE INVENTION

The present invention is similar to my earlier co-pending application U.S. Ser. No. 10/916,759 published as US 2005/0041018 A1 in that it also comprises two bus-bars on two of the four possible sides of the element, and has a central sensing region which exhibits anisotropic properties. However, the present invention is an improvement on the teaching of patent application U.S. Ser. No. 10/916,759 published as US 2005/0041018 A1 by means of a new pattern within the sensing region that avoids cross-conduction between the bus-bars. Advantageously, the sensing element of the invention eliminates pin-cushion distortion entirely or almost completely.

The sensing region may employ either opaque, translucent, or clear electrically conductive materials within it which, unlike U.S. application Ser. No. 10/916,759 published as US 2005/0041018 A1, may be of virtually uncontrolled resistance.

The sensing region comprises patterned elements of conductor which interleave between two sides of the sensing region, each of the two sides being bounded by a resistive strip having a controlled resistance to which at least two electrode connections are made.

The present invention provides a touch sensitive position sensor comprising: a substrate defining a touch sensitive platform; first and second resistive bus-bars arranged spaced apart on the substrate; and a conductive sensing area comprising conductive elements which radiate a capacitive field arranged between the bus-bars such that the conductive elements are connected to either of the first or second resistive bus-bars but not both and the currents induced in the conductive sensing area flow towards the bus-bars. From the bus-bars, the current flows to connection points on the bus-bars. The currents within the conductive sensing area are prevented from flowing within the conductive region in a direction parallel to the bus-bars.

In embodiments of the invention, the first and second conductive elements are shaped such that adjacent ones co-extend over the conductive sensing area to provide respective ratiometric capacitive signals.

In a preferred embodiment of the invention, the plurality of conductive elements between the first and second bus-bars have a substantially graduated configuration which may involve the use of triangulated shapes or other forms of graduated interleaving. In one embodiment the first and second conductive elements have complimentary tapers over their distance of co-extension to provide the ratiometric capacitive signals. In another embodiment, the first and second conductive elements elements have adjacent blocks of varying area over their distance of co-extension to provide the ratiometric capacitive signals.

Signal processing is generally performed as described in U.S. application Ser. No. 10/916,759 published as US 2005/0041018 A1, the relevant parts of which are referred to and incorporated herein by reference. Moreover, the width of the conductive elements is preferably greater than the gaps between them so as to increase the amount of available surface area to improve coupling to a finger. An important feature of the invention is that the conductive elements originating from one of the bus-bars are electrically isolated, that is not connected, to the other opposing bus-bar or the conductive elements connected to it. Therefore, the conductive elements originating from the first resistive bus-bar are not galvanically connected to the second resistive bus-bar, and the conductive elements originating from the second resistive bus-bar are not galvanically connected to the first resistive bus-bar.

Each bus bar may be made of a chain of discrete resistors joined by interconnects. Alternately, each bus bar may be made of a resistive strip of uniform resistance per unit length, for example made of a carbon-based film.

The conductive elements originating from the first and second resistive bus-bars are spaced apart by non-conducting gaps or spaces which may be typically formed by ablation or etching, or by selective deposition of material to form the conductive elements. The conductive material may typically comprise clear Indium Tin-Oxide ('ITO') material or a clear conductive polymer such as Agfa's Orgacon™ in the case of clear touch screens, or an opaque conductor such as carbon film when transparency is not required. Varying the width of the gaps and the amount of interleaving between the conductive elements results in a variation of measured capacitance from one bus bar to the other.

The present invention significantly reduces or completely removes the deleterious effect of pin-cushion distortion and greatly enhances linearization of the output signals, when compared with my co-pending U.S. application Ser. No. 10/916,759 published as US 2005/0041018 A1. In U.S. Ser. No. 10/916,759 published as US 2005/0041018 A1, the presence of conductive elements in the sensing region coupled to both bus bars cause the voltage gradients to pull the signal to opposing corners. When the sensing region is not galvanically coupled from one bus bar to the other, as in the present invention, the voltage gradients remain uniform and undistorted. Capacitive coupling from one side to the other does not produce a distortion component provided the capacitance is allowed to fully charge and discharge across all locations in the sensing region.

The present invention also provides a touch sensitive position sensor for detecting the position of an object in two dimensions, wherein the position sensor has first and second resistive bus-bars separated by a sensing area, the sensing area comprising multiple interleavings of conductive material arranged between the bus-bars such that the interleavings are connected to one or the other bus-bar but not both, so that induced electric currents flow preferentially towards the bus-bars, the bus-bars being galvanically isolated from each other within the sensing area.

Unless otherwise noted hereinafter, the terms 'connection(s)' or 'connected' refer to either galvanic contact or capacitive coupling. 'Element' refers to the physical electrical sensing element made of conductive substances. 'Electrode' refers to one of the galvanic connection points made to the element to connect it to suitable driver/sensor electronics. The terms 'object' and 'finger' are used synonymously in reference to either an inanimate object such as a wiper or pointer or stylus, or alternatively a human finger or other appendage, any of whose presence adjacent the element will create a localized capacitive coupling from a region of the element back to a circuit reference via any circuitous path, whether galvanically or non-galvanically. The term 'touch' includes either physical contact between an object and the element, or, proximity in free space between object and element, or physical contact between object and a dielectric (such as glass) existing between object and element, or, proximity in free space including an intervening layer of dielectric existing between object and element. The mention of specific circuit parameters, or orientation is not to be taken as limiting to the invention, as a wide range of parameters is possible using no or slight changes to the circuitry or algorithms; specific parameters and orientation are mentioned only for explanatory purposes. Note my prior patents covering charge-transfer capacitive sensing, particularly U.S. Pat. No. 5,730,165, U.S. Pat. No. 6,288,707, U.S. Pat. No. 6,466,036, U.S. Pat. No. 6,535,200, U.S. Pat. No. 7,148,704 and my co-pending U.S. application Ser. No. 10/916,759 published as US 2005/0041018 A1. In particular it should be noted that the electronic sensing circuitry and methods described in each of these patents can be used in conjunction with the invention described herein, but, these methods are not the only ones. A variety of capacitive sensing circuits can be used with the invention. Various electrical circuits and sensing methods described in these patents can be employed to drive the electrodes of the invention and to interpret the results.

It is one object of the invention to provide a 2DxT sensing element using common, inexpensive materials and production processes, with anisotropic galvanic conduction characteristics.

It is a further object of the invention to permit position interpolation so as to achieve the highest possible resolution with the simplest possible pattern.

It is another object of the invention to provide a 2DCT element allowing a high positional resolution and low granularity result with relatively coarse raw signal analogue-to-digital converter (ADC) resolution.

Another object is to provide a 2DCT element that is less susceptible to thermal drift, and is highly repeatable in the manufacturing process.

Another object of the invention is to provide a 2DCT element that either requires a highly simplified 'learn' calibration process compared with the prior art, or, calibration via design, or, none at all.

Another object is to provide for a 2DCT element having only one required layer of conductive material.

A further object is to allow the 2DCT sensing layer to reside on the rear of relatively thick dielectric cover lenses such as glass or plastic sheet, up to 10 mm in thickness or more, or through air by pointing.

A further object of the invention to provide a 2DCT sensing element having relatively simple wiring requirements;

Further objects of the invention are to provide for a sensor having high reliability, a sealed surface, low power consumption, and the ability to be controlled and sensed directly using off-the-shelf microcontrollers and non-exotic drive electronics.

Although it is believed that the foregoing rather broad summary description may be of use to one who is skilled in the art and who wishes to learn how to practice the invention, it will be recognized that the foregoing recital is not intended to list all of the features and advantages. Those skilled in the art will appreciate that they may readily use both the underlying ideas and the specific embodiments disclosed in the following Detailed Description as a basis for designing other arrangements for carrying out the same purposes of the present invention and that such equivalent constructions are within the spirit and scope of the invention in its broadest form. Moreover, it may be noted that different embodiments of the invention may provide various combinations of the recited features and advantages of the invention, and that less than all of the recited features and advantages may be provided by some embodiments.

BRIEF DESCRIPTION OF THE DRAWINGS

For a better understanding of the invention and to show how the same may be carried into effect reference is now made by way of example to the accompanying drawings in which:

FIG. 3b shows a magnified view of part of the in-built resistive bus-bar of FIG. 3a.

FIG. 3c shows a magnified view of part of another type of in-built bus-bar which may be used in a pattern similar to that shown in FIG. 3a.

DETAILED DESCRIPTION

Figure 1A:
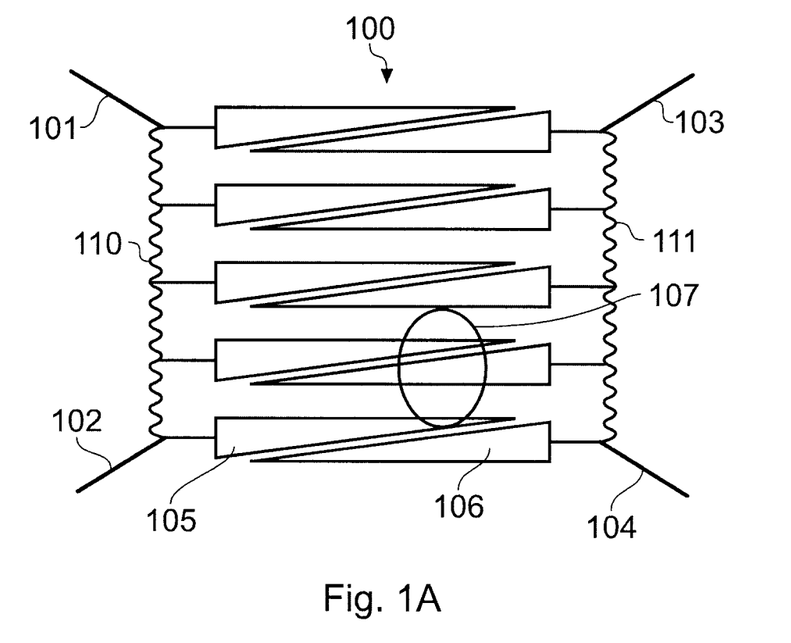
FIG. 1a schematically shows a patterned conductive material with four electrode connection points and an external resistive bus-bar used to form a sensing element according to an embodiment of the invention.
Figure 1B:
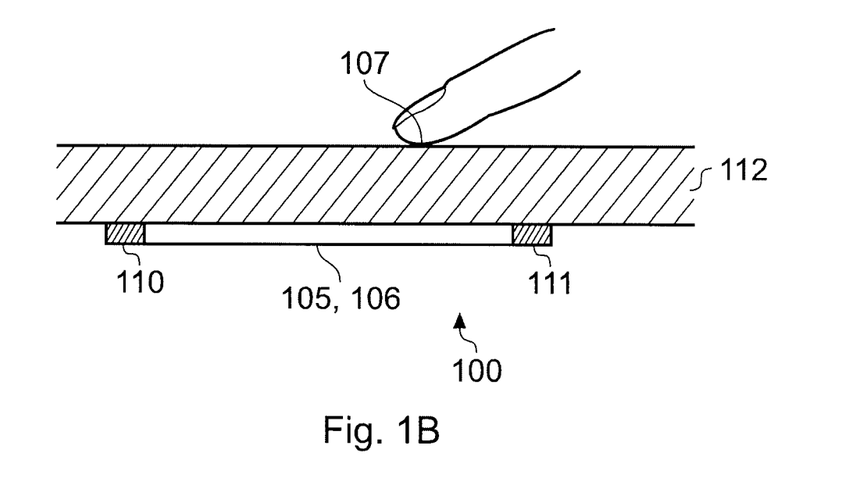
FIG. 1b shows the sensing element of FIG. 1a deposited on the rear of a glass panel.

Referring to the drawings, FIGS. 1a, 1b illustrate a 2DCT sensing element 100 embodying the invention with four connection electrodes 101, 102, 103, 104 at respective corners of the sensing element. The electrodes 101-104 are connected to a sensing circuit (not shown). On the left and right sides of the sensing element 100 are shown respective resistive elements 110, 111 which connect between electrodes 101 and 102 and electrodes 103 and 104 respectively. Within the sensing region are two distinct sets of triangulated conductive shapes, one set 105 being connected to resistive side 110 and the other set 106 connected to resistive side 111. The triangulated shapes are interleaved so as to provide a left-right field gradient; in use, a finger running from the left side to the right side of the sensing element would naturally induce a capacitance gradation which can be measured on electrodes 101-104 in such a way as to allow a determination of horizontal position using ratiometric calculations. This is described in part in U.S. Pat. No. 6,297,811, in conjunction with wire outline electrode shapes.

The conductive shapes 105 and 106 are formed with an electrode pattern that defines a sensitive area for the device. The electrode pattern is arranged on a substrate. The substrate may conveniently be a flexible transparent plastics material such as polyethylene terephthalate (PET). The substrate will generally be insulating. The electrode pattern is made, for example, of indium tin oxide (ITO) having a resistivity of a few hundred ohm/square. This is a transparent material and thus suitable for display applications, or other applications where an underlying button or other template needs to be visible.

More generally, the electrode pattern can be made by depositing or removing any suitable conductive material. Deposition can be by vapour deposition or screen printing, for example. Removal can be by laser or chemical etching, for example.

The electrode pattern defines the tapered electrodes 105, 106. As illustrated, both the first and second electrodes 105, 106 generally extend in the x-direction and are interleaved in the y-direction. The electrodes have tapered triangular shapes. The triangular tapered electrodes are arranged at the left and right hand sides of the sensitive area. Adjacent paired electrodes 105, 106 co-extend in the x-direction over the sensitive area from the left and right sides of the sensitive area respectively. In this way each adjacent pair of co-extensive x-electrodes forms a so-called slider as described in U.S. Pat. No. 7,148,704. Specifically the slider is of the kind illustrated in FIG. 15 of U.S. Pat. No. 7,148,704, the relevant contents of which describing operation of such a slider is incorporated herein by reference. It will be appreciated that the electrode elements are suitably shaped and dimensioned in relation to the actuating device, typically a human finger 107, to provide a ratiometric capacitive signal spanning the length of their mutual extension in the x-direction, i.e. overlap in the x-direction. The resistive bus-bars 110, 111 running vertically, i.e. in the y-direction, along the sensing element 100 provide a top-bottom field gradient; running a finger from the top to the bottom of the sensing region would naturally induce a capacitance gradation which can be measured on electrodes 101-104 in such a way as to allow a determination of vertical position using ratiometric calculations. This is described in my U.S. Pat. No. 7,148,704.

Remarkably, the patterned layer of FIG. 1a produces no pin-cushion effect on any edge of the sensing element. Unlike my co-pending U.S. application Ser. No. 10/916,759 published as US 2005/0041018 A1, there is no galvanic conduction between the left and right sides since the triangulated shapes are isolated from each other, so no DC current can pass from one side to the other side of the sensing element. This being the case, merely allowing the sensing circuit to operate at a low enough frequency (or long enough of a pulse width) to allow the capacitive gradients to stabilize is sufficient to make the triangulated elements equipotential, a condition under which no net current flow can take place from left to right between the two bus-bars. If the drive signal is not allowed to settle, for example due to RC time constant effects, the film design may take on pin-cushion effects.

The size of the triangulated shapes in the embodiment of FIG. 1a should be such that finger contact 107 is larger than at least one of the repeating pattern sets, so as to always provide reasonable levels of interpolation. A pattern set is one left connected triangle and one adjacent right connected triangle.

Due to the use of external bus-bars in FIG. 1a, the material used in the sensing region to make up the triangulated shapes can be of uncontrolled resistance, that is it may be made of metal, such as, copper, or it may be made of Indium Tin Oxide (ITO) of a reasonable resistance such as 300 ohms to 1,000 ohms per square. Variation in the resistance of the sensing region elements has little or no effect on sensing response.

A suitable range of resistance for the bus-bars is in the order of 20K to 500K ohms end to end, but other resistance values can be used outside of this range.

Figure 2:
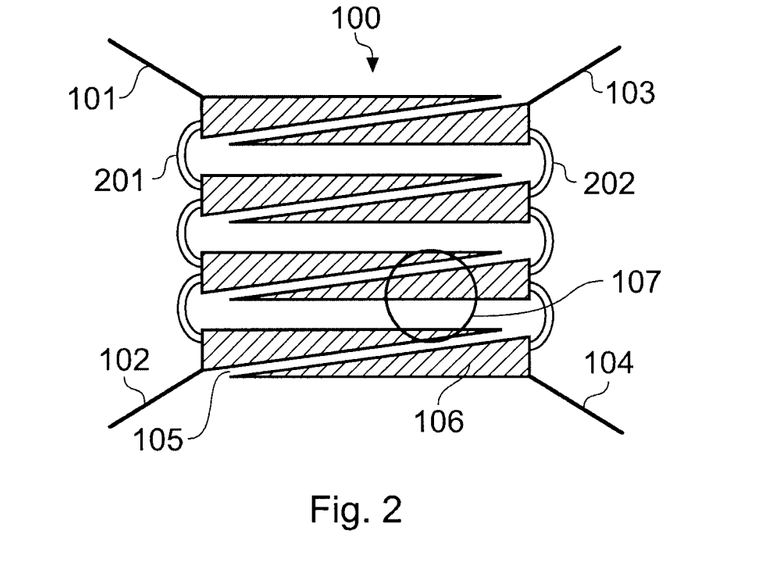
FIG. 2 shows a patterned conductive material with four electrode connection points and an in-built resistive bus-bar formed from the conductive material according to another embodiment of the invention.

FIG. 2 shows the same basic pattern configuration as the embodiment of FIG. 1, except that the resistive bus-bars 110, 111 are in-built into the patterned conductive material and shown as 201, 202. If the material is made of a suitably high resistance, such as 300 ohms per square ITO, then a narrow enough track of ITO can serve as the resistive bus-bar. Alternatively the resistance of the bus-bars can be raised by using zigzag lines to increase the path length.

Figure 3A:
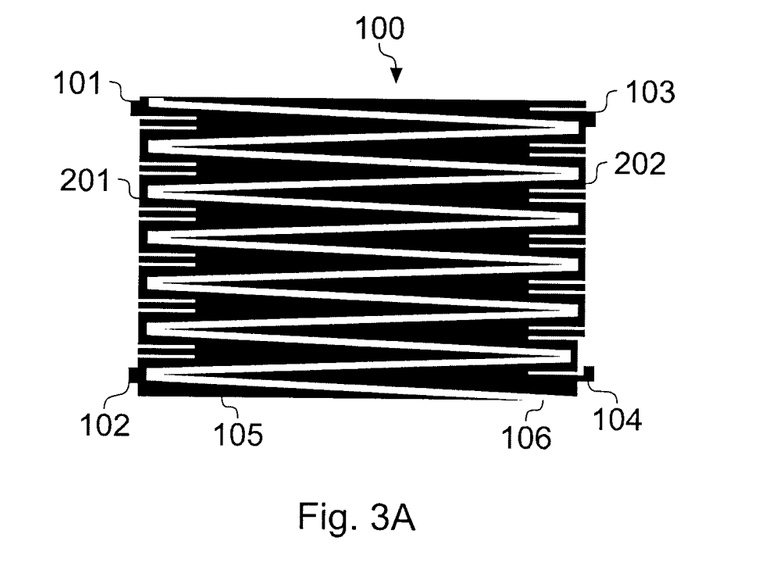
FIG. 3a shows a patterned conductive material with four connection points and an in-built resistive bus-bar formed from the conductive material according to another embodiment of the invention, where the resistance is increased by using a modified pattern compared to that of FIG. 2.
Figure 3B:
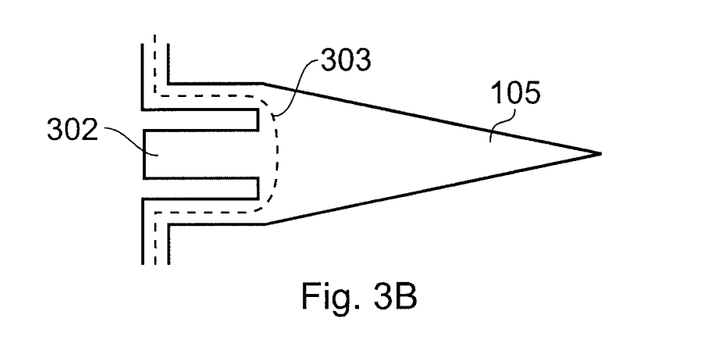
Figure 3C:
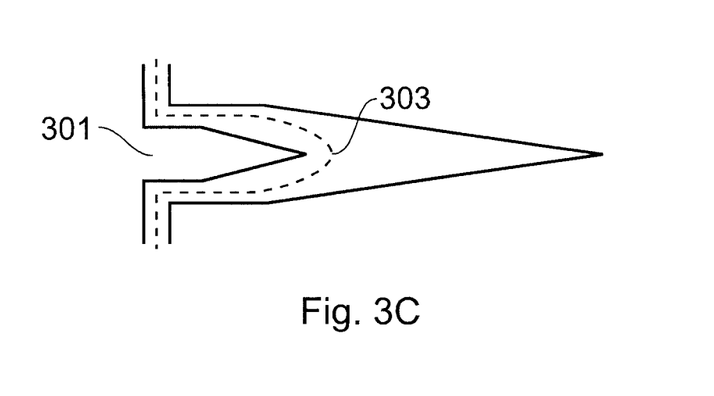

FIGS. 3a, 3b show the same configuration as that shown in FIG. 2 except that the triangles of conductive material are used to increase the path length of the bus-bars without substantially increasing the need for 'dead' side areas. In many applications the sensing region needs to be as wide as possible with little room for side connections, and the bus-bars shown in the embodiments of FIGS. 1 and 2 may take up too much room. Forcing the currents into the triangulated shapes increases path length and hence bus-bar resistance without increasing the need for side space. Referring to FIG. 3c which shows part of a resistive bus-bar which may be built in to a pattern similar to that embodied in FIG. 3a, gap 301 forces current flows 303 into and within the triangulated shape, lengthening the current path and increasing resistance. In FIG. 3b, which shows part of the resistive bus-bar 201 of the embodiment of FIG. 3a, the portion of conductive material 302 mostly fills the gap 301 again without substantially reducing the path resistance, so that there is maximal conductive material surface area to emit the required sensing field in that region.

Figure 4:
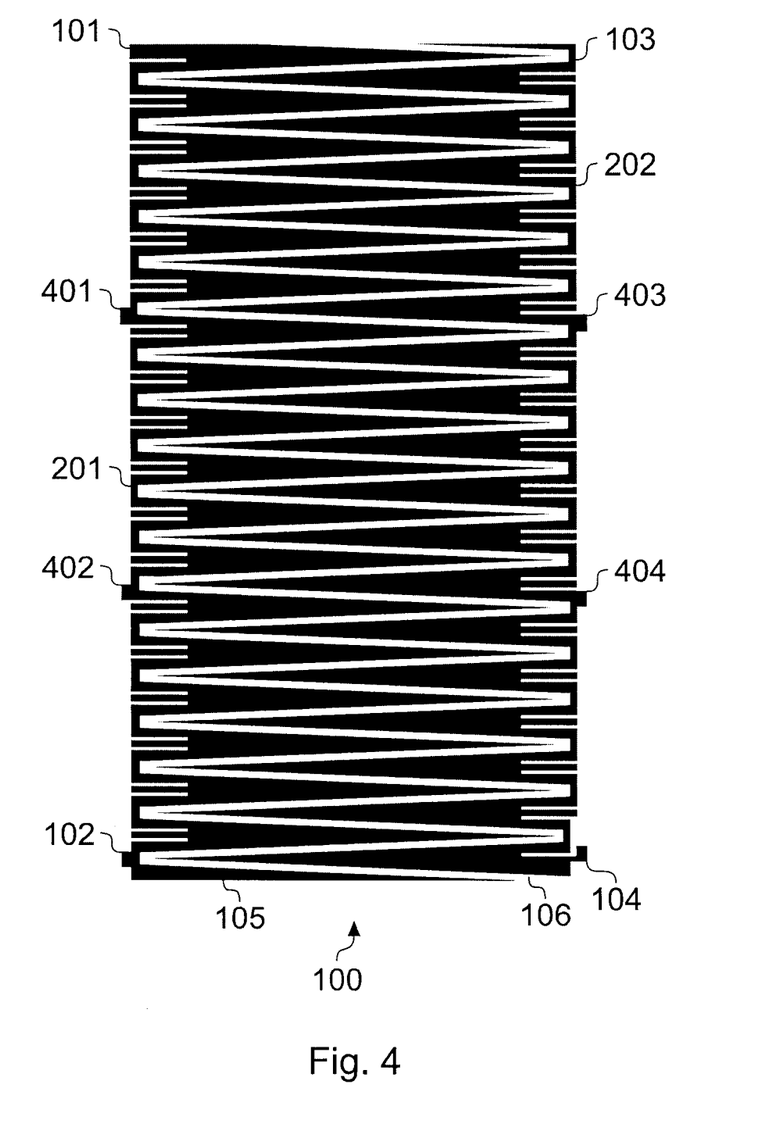
FIG. 4 schematically shows a patterned conductive material with eight electrode connection points used to form a sensing element according to another embodiment of the invention.

FIG. 4 shows a sensing element 100 of patterned conductive material embodying the invention with eight connection points. Electrodes 101-104 are provided at the corners of the pattern of conductive material. Four further electrodes 401, 402, 403, 404 are provided as pairs along respective ones of the bus bars 201, 202. These further electrodes may be coupled to drive channels similar to those coupled to the corner electrodes to provide a further four output signals. The various drive channels may be provided by separate drive circuits or by appropriate multiplexing of a single drive circuit. The sensing element 100 may in effect be considered as comprising three sensing elements. That is to say the sensing element may be considered to comprise a lower sensing element cornered by the four electrodes labelled 402, 102, 404, 104; a middle sensing element cornered by the four electrodes labelled 401, 402, 403, 404; and an upper sensing element cornered by the four electrodes labelled 101, 401, 103, 403.

In the embodiment of FIG. 4, the use of additional electrode connections improves the suppression of handshadow effects as described in my U.S. Ser. No. 10/341,948 (abandoned) which published as EP 1335318 A1. While it has been found that four electrode connections per side are sufficient to suppress handshadow effect on 2DCT surfaces of up to 4 inches diagonal in size, in practice any number of connections can be used per side (with a minimum of two) depending on the screen size, panel thickness, and desired degree of handshadow suppression.

Figure 5:
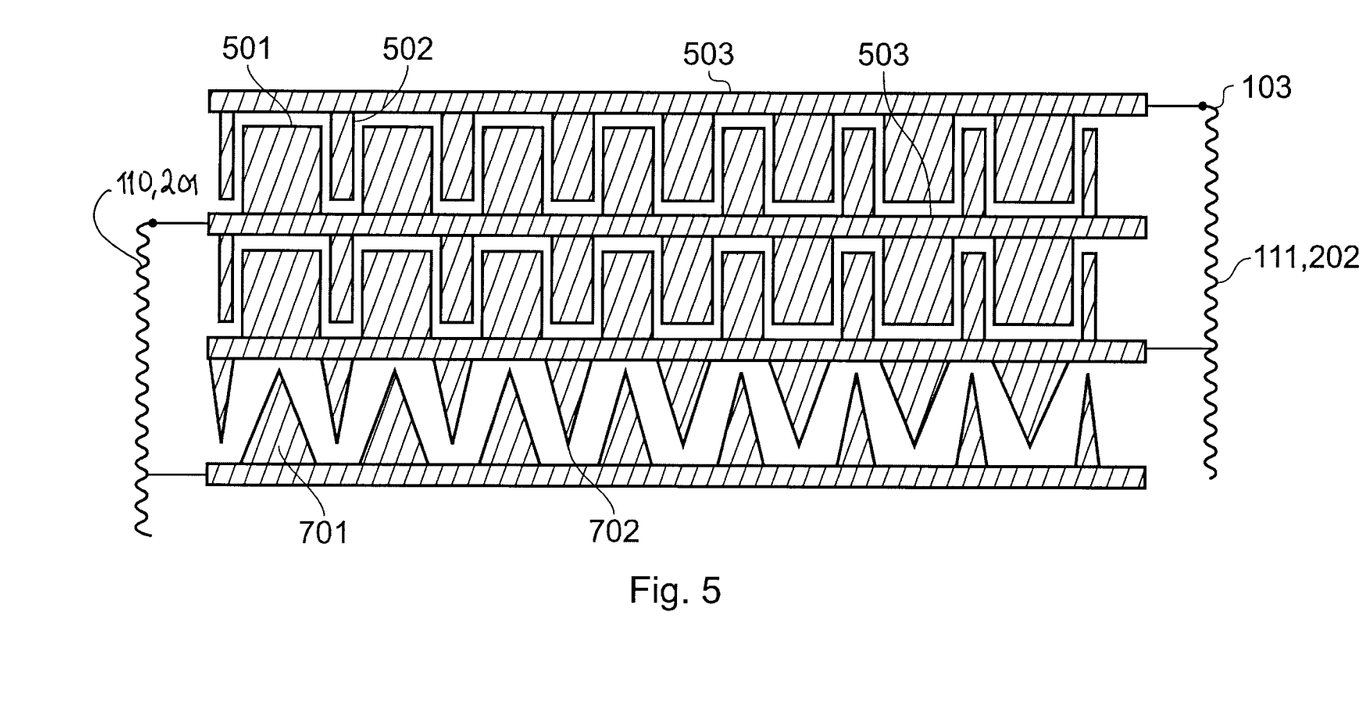
FIG. 5 schematically shows part of an alternative pattern of conductive material according to another embodiment of the invention.

FIG. 5 shows an alternate pattern for the sensing electrodes to create the required left-right field gradient. These electrodes use graduated rectangles of conductor 501 and 502 connected to spines 503 interleaved in such a way as to tailor the gradient. The pattern shows two rows of graduated rectangles 501, 502; the first set of rectangles 501 gradually decrease in size from resistive bus-bar 110 (201) towards bus-bar 111 (202). The second set of rectangles 502 interleave with the rectangles 501 and gradually increase in size from bus-bar 110 to bus-bar 111. The third row shown in the pattern comprises graduated triangles of conductor 701, 702 constructed in a similar arrangement to the rows of rectangles. Side bus-bars and connections can be made similarly to those shown in the embodiments of FIGS. 1, 2, 3a and 4. Other patterns can similarly be used without departing from the spirit of the invention.

Figure 6:
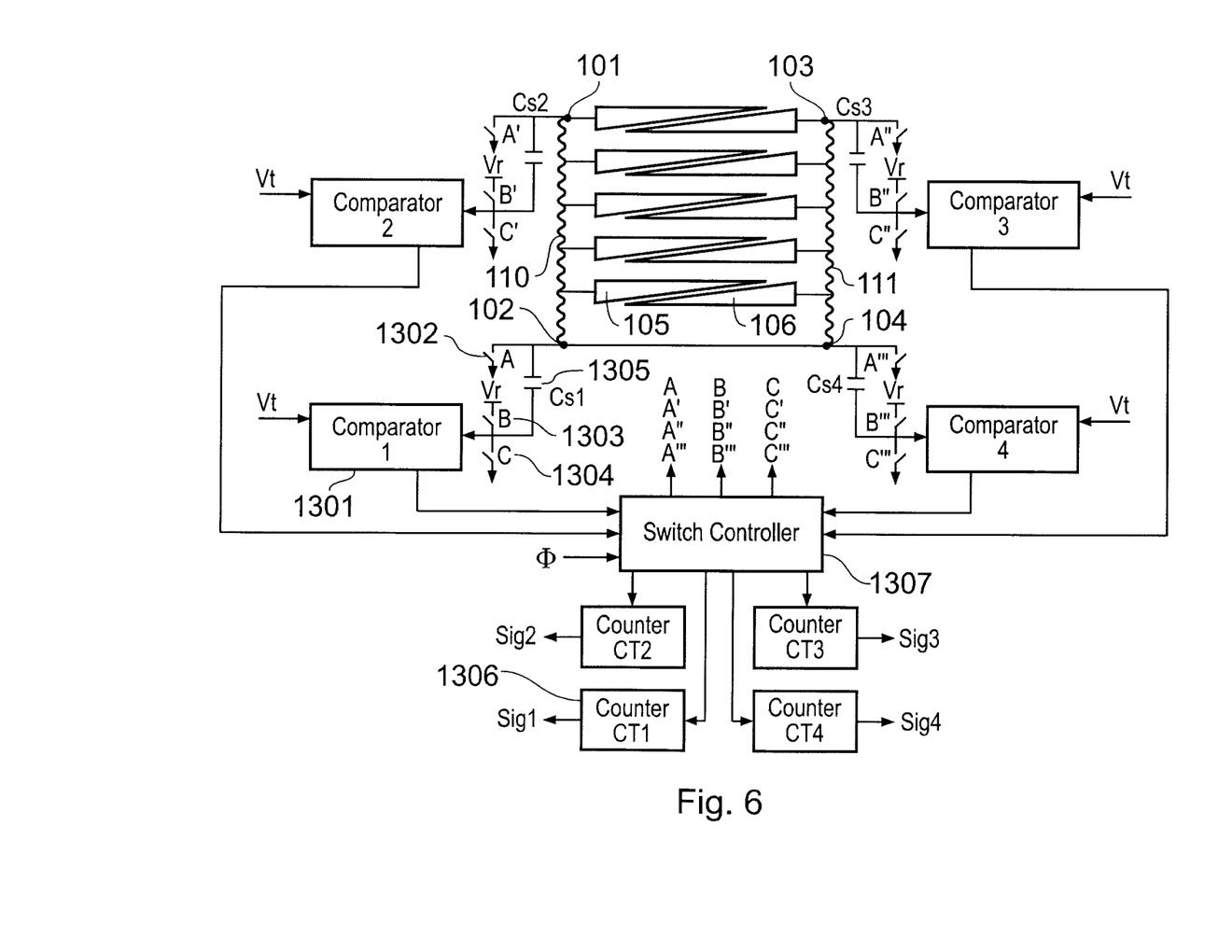
FIG. 6 shows one form of sensing circuit used to drive the sensing electrode connections of FIG. 1.

FIG. 6 shows one form of a sensing circuit used to drive the sensing electrode connections of any of the patterns described in the abovementioned Figures. The repeated switching of switches 1302, 1303, 1304 at locations A, A', A", A''', B, B', B", B''', and C, C', C", C''' are performed simultaneously at each electrode so as to inject and measure charge using four capacitors, also referred to as sampling capacitors, Cs, 1305, at equal moments in time. This is performed via switch controller 1307. Signal outputs are the tabulated number of switching cycles for each electrode required to exceed a threshold voltage Vt, as determined by a voltage comparator 1301. The tabulation of cycle counts for each electrode is performed by four counters at 1306. This type of circuit is described more fully in my U.S. application Ser. No. 10/916, 759 published as US 2005/0041018 A1, in conjunction with its FIGS. 13, 14, and 15, which is incorporated by reference herein. These circuits operate preferably with circuitry of the type disclosed in my U.S. Pat. No. 6,466,036.

Alternatively the invention can use any capacitive sensing circuit described in literature. The gradient response of the sensing region is normally the same regardless of the type of drive circuitry. The invention is not reliant on any one acquisition method.

Materials, Fabrication

The 2DCT element is preferably made of a clear conductor of suitable resistance on the back of a glass or plastic sheet covering the display, if a touchscreen, or over a suitable dielectric substrate if a mousepad, etc. The resistive bus-bars, when implemented according to the embodiment of FIG. 1, can be made of discrete resistors, a deposited resistive ink, or a sputtered or vapor deposited conductor.

Patterning into bus-bars and sensing elements can be via vapor deposition using a suitable stencil to prevent unwanted areas of coating, or via silk screening to create the desired pattern, or via pad-printing, or via laser scribe or chemical etching or chemical reaction, or any other process which can create a patterned layer. In the case of Agfa Orgacon™ conductive polymer the pattern can be created by using sodium hypochlorite to force areas to become non-conductive via chemical reaction without actual material removal.

Fabrication can entail the use of normal touchscreen or touchpad methods such as vapor deposition of appropriate materials onto a glass sheet placed in front of a display, or on the display itself.

In-mold decorating ("IMD") entails the use of a graphic sheet or layer placed inside the injection mold or cast prior to the introduction of fluid plastic. Once molded, the layer becomes an integral part of the resultant plastic piece. In the case of a 2DCT, a conductive element of the type according to the invention is placed in the mold for a display cover; when injected, the conductive layer becomes fused to one side of the cover. In this way complex cover shapes, including those having compound curves, can be created which include an integral 2DCT at extremely low cost.

Electrode connections can be made via wires bonded to the corners, or via conductive rubber pillars, or metal springs, etc. Conductive rubber is a method of choice for very low cost connection from an underlying PCB containing the driver circuitry. This type of construction is described in detail in conjunction with FIG. 16 of my co-pending U.S. Ser. No. 10/916,759 published as US 2005/0041018 A1.

2DCT Acquisition Manipulation

Problems associated with 2DCT's include interference from outside electrostatic or radio sources having a frequency at the operating frequency of the element, or some harmonic thereof. These problems can be attenuated by using a modulated operating frequency for the signal acquisition so as to reduce or prevent signal-noise aliasing or beating. This can involve the use of frequency hopping, chirps, or pseudo-random frequency modulation. These methods are known as 'spread-spectrum' modulation.

Post processing can include the use of majority vote filtering, median filtering, averaging, and so on to reduce the residual effects of noise that are already attenuated by means of the frequency modulation.

Low frequency interference can be caused by local mains fields and so on. This form of interference can be attenuated by synchronizing the acquisition to the interfering source, for example 50 or 60 Hz, as described in the datasheet for the Quantum Research Group Ltd (UK) QT310 device.

2DCT Driven Shield

The element is compatible with driven shield methods to reduce interference from LCD displays, VFD switching, etc. This entails the use of a conductive plane behind the element positioned between the element and the interfering source. A drive shield can also protect against signal disturbance from motion behind the element. Driven back-shields are commonly used in the construction of 2DCT's.

2DCT Wake-Up

In many applications it is desirable to have a 'wakeup' function, whereby the entire device 'sleeps' or is in some quiescent or background state. In such cases, it is often desirable to have a wake signal from mere proximity of a human body part some distance away.

The element can be driven as a single large capacitive electrode without regard to position location, while the unit is in the background state. During this state the electronic driver logic looks for a very small change in signal, not necessarily enough to process as a 2D coordinate, but enough to determine that an object or human is in proximity. The electronics then 'wakes up' the overall system and the element is driven so as to become a functional 2DCT once again.

Tablet, Mouse Pad Usage; Injection Mode

The element of the invention in 2DCT mode is suitable as a mouse pad, or as a tablet type input device. In these roles, there is no need for optical transparency. A stylus can be used with the element either to pick up a radiated electric field from the element, or to inject a signal into the element, or to act as a human finger.

In injection mode, the element of the invention merely operates in reverse. A signal from a tethered pen is injected capacitively into the element in a region surrounding the point of contact. The signal is then apportioned ratiometrically to the connection electrodes, from whence it can be picked up and conveyed to a measurement circuit of almost any type already described in literature and then processed to create an indicative result.

SUMMARY

In one aspect, the invention provides for an improved form of 2D sensing device via anisotropic conduction which also eliminates or drastically reduces pin-cushion distortion. An important aspect is that it is made as a single-layer element having a core sensing area that behaves in an anisotropic manner to current flows and which has no galvanic connection between two bounding bus-bars.

There are many variations possible as will become evident to those skilled in the art, involving various combinations of detection methods or switch sequences outlined specifically herein. The methods disclosed herein can be combined with other methods as taught in any number of my prior patents including methods for drift compensation, calibration, moisture suppression using short switch closure times, and the like. Particular note should be made of the various possible combinations of features disclosed in my own prior art involving capacitive sensing methods. Also note the capacitive products described in the datasheets of Quantum Research Group Ltd (UK), many of which have features germane to the instant invention.

It will be appreciated that although particular embodiments of the invention have been described, many modifications/additions and/or substitutions may be made within the spirit and scope of the present invention.

The invention claimed is:

1. An apparatus comprising:
    a first resistive element extending in a first direction, a first end of the first resistive element coupled to a first connection electrode and a second end of the first resistive element coupled to a second connection electrode;
    a second resistive element extending in the first direction and spaced apart from the first resistive element in a second direction, a first end of the second resistive element coupled to a third connection electrode and a second end of the second resistive element coupled to a fourth connection electrode, the first and second resistive elements being located within a common layer;
    a plurality of first conductive elements coupled to the first resistive element and not the second resistive element, the plurality of first conductive elements extending in the second direction between the first and second resistive elements; and
    a plurality of second conductive elements coupled to the second resistive element and not the first resistive element, the plurality of second conductive elements extending in the second direction between the first and second resistive elements, the first and second conductive elements collectively forming a conductive sensor, each of the second conductive elements being adjacent one or more of the first conductive elements and separated from the one or more ones of the first conductive elements by one or more non-conducting gaps, currents induced in the conductive sensor by capacitive coupling with the conductive sensor flowing only in the second direction and not in the first direction;
    wherein the plurality of first conductive elements increase a resistance of the first resistive element by lengthening a current path of the first resistive element; and
    wherein the plurality of second conductive elements increase a resistance of the second resistive element by lengthening a current path of the second resistive element.

2. The apparatus of claim 1, wherein adjacent ones of the first and second conductive elements co-extend over the conductive sensor to provide respective ratiometric capacitive signals.

3. The apparatus of claim 2, wherein the first and second conductive elements have complimentary tapers over their distance of co-extension to provide the ratiometric capacitive signals.

4. The apparatus of claim 2, wherein the first and second conductive elements have adjacent blocks of varying area over their distance of co-extension to provide the ratiometric capacitive signals.

5. The apparatus of claim 1, wherein the first and second conductive elements are greater in width than the non-conductive gaps.

6. The apparatus of claim 1, wherein the first and second conductive elements comprise substantially clear indium tin oxide.

7. The apparatus of claim 1, wherein the first and second conductive elements comprise a substantially clear conductive polymer.

8. The apparatus of claim 1, wherein the first and second conductive elements comprise a substantially opaque conductor.

9. The apparatus of claim 1, wherein the first direction is vertical and the second direction is horizontal.

10. The apparatus of claim 1, wherein a touch screen or touch pad comprises the conductive sensor formed by the first and second conductive elements.

11. The apparatus of claim 10, wherein the touch screen or touch pad overlies an electronic display.

12. A method comprising:
    conducting one or more currents in a first direction only and not in a second, the currents having been induced in a conductive sensor by a capacitive coupling with the conductive sensor, the conductive sensor comprising a plurality of first conductive elements and a plurality of second conductive elements, the first conductive elements being coupled to a first resistive element and not a second resistive element, a first end of the first resistive element coupled to a first connection electrode and a second end of the first resistive element coupled to a second connection electrode, the second conductive elements being coupled to the second resistive element and not the first resistive element, a first end of the second resistive element coupled to a third connection electrode and a second end of the second resistive element coupled to a fourth connection electrode, the first resistive element extending in the second direction, the second resistive element extending in the second direction and being spaced apart from the first resistive element in the first direction, the first and second resistive elements being located within a common layer, the first conductive elements extending in the first direction between the first and second resistive elements, the second conductive elements extending in the first direction between the first and second resistive elements, each of the second conductive elements being adjacent one or more of the first conductive elements and separated from the one or more ones of the first conductive elements by one or more non-conducting gaps;
    wherein the plurality of first conductive elements increase a resistance of the first resistive element by lengthening a current path of the first resistive element; and wherein the plurality of second conductive elements increase a resistance of the second resistive element by lengthening a current path of the second resistive element.

13. The method of claim 12, wherein adjacent ones of the first and second conductive elements co-extend over the conductive sensor to provide respective ratiometric capacitive signals.

14. The method of claim 13, wherein the first and second conductive elements have complimentary tapers over their distance of co-extension to provide the ratiometric capacitive signals.

15. The method of claim 13, wherein the first and second conductive elements have adjacent blocks of varying area over their distance of co-extension to provide the ratiometric capacitive signals.

16. The method of claim 12, wherein the first and second conductive elements are greater in width than the non-conductive gaps.

17. The method of claim 12, wherein the first and second conductive elements comprise substantially clear indium tin oxide.

18. The method of claim 12, wherein the first and second conductive elements comprise a substantially clear conductive polymer.

19. The method of claim 12, wherein the first and second conductive elements comprise a substantially opaque conductor.

20. The method of claim 12, wherein a touch screen or touch pad comprises the conductive sensor formed by the first and second conductive elements.

21. The method of claim 18, wherein the touch screen or touch pad overlies an electronic display.

22. A device comprising:
- a first resistive element extending in a first direction, a first end of the first resistive element coupled to a first connection electrode and a second end of the first resistive element coupled to a second connection electrode;
- a second resistive element extending in the first direction and spaced apart from the first resistive element in a second direction, a first end of the second resistive element coupled to a third connection electrode and a second end of the second resistive element coupled to a fourth connection electrode; and
- a touch screen or touch pad comprising:
  - a plurality of first conductive elements coupled to the first resistive element and not the second resistive element, the plurality of first conductive elements extending in the second direction between the first and second resistive elements; and
  - a plurality of second conductive elements coupled to the second resistive element and not the first resistive element, the plurality of second conductive elements extending in the second direction between the first and second resistive elements, the first and second resistive elements being located within a common layer, the first and second conductive elements collectively forming a conductive sensor, each of the second conductive elements being adjacent one or more of the first conductive elements and separated from the one or more ones of the first conductive elements by one or more non-conducting gaps, currents induced in the conductive sensor by capacitive coupling with the conductive sensor flowing only in the second direction and not in the first direction;
- wherein the plurality of first conductive elements increase a resistance of the first resistive element by lengthening a current path of the first resistive element; and
- wherein the plurality of second conductive elements increase a resistance of the second resistive element by lengthening a current path of the second resistive element.

23. The device of claim 22, wherein the touch screen or touch pad further comprises one or more portions of the first resistive element or one or more portions of the second resistive element.

24. The device of claim 23, further comprising an electronic display that the touch screen or touch pad overlies.

* * * * *